UNITED STATES PATENT OFFICE 2,108,144

VAT DYESTUFFS CONTAINING NITROGEN AND PROCESS OF MAKING SAME

Heinz Scheyer, Frankfort-on-the-Main, and Emil Schwamberger, Frankfort-on-the-Main-Fechenheim, Germany, assignors to General Aniline Works, Inc., New York, N. Y., a corporation of Delaware No Drawing. Application October 4, 1935, Serial No. 43,508. In Germany October 10, 1934

5 Claims. (Cl. 260—61)

Our invention relates to vat dyestuffs containing nitrogen.

U. S. Patent No. 2,042,683, describes new vat dyestuffs containing nitrogen obtained by reacting on halogenated condensation products of the general formula:

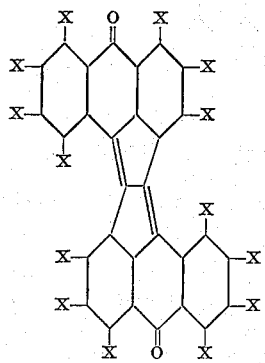

in which one or more radicles signified by X are halogen, the remainder being hydrogen, with such nitrogenous compounds as contain in the molecule one or more replaceable hydrogen atoms attached to nitrogen, particularly with aminocompounds of the anthraquinone series. The condensation products, so far as they contain the radicle of an aminocompound of the antraquinone series may be further treated with one of the various customary acid condensing agents or with caustic alkalies.

Condensation products of the same type are obtained according to our present invention by starting from condensation products corresponding to the above formula, but containing in the positions signified by X one or more aminogroups (instead of halogen atoms) and condensing these products with halogen compounds containing at least one replaceable halogen atom, particularly with those containing an anthraquinone or dibenzanthrone (violanthrone) or anthanthrone radicle.

The present modified process is of advantage in cases in which the amines used as second reaction component in the process of our aforesaid application are difficultly accessible or are less reactive than the corresponding halogen compounds.

The amino derivatives corresponding to the condensation products of the above formula are obtainable for instance by nitration of the parent compound of these products and subsequent reduction.

The dyestuffs obtained according to our present invention of the general formula:

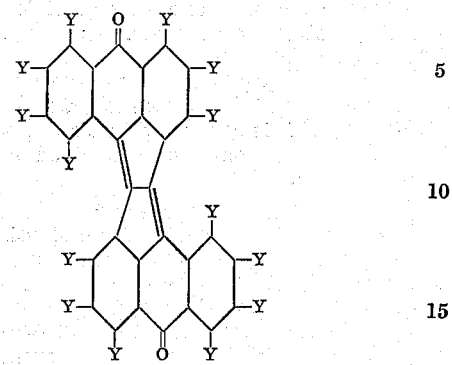

in which one or two radicles signified by Y are radicles of the grouping —NH—A, wherein A means an anthraquinone radicle, to which further condensed nuclei may be attached, the remainder being hydrogen, dye cotton from the vat in most cases in brown shades which turn more towards yellow when the dyestuffs are aftertreated with condensing agents.

In order to further illustrate our invention, the following examples are given, the parts being by weight and all temperatures in centigrade degrees. We wish it, however, to be understood that our invention is not limited to the particular products nor reaction conditions mentioned therein.

Example 1

40 parts of a monoamino compound obtained by nitration and reduction starting from the brown vat dyestuff of the formula:

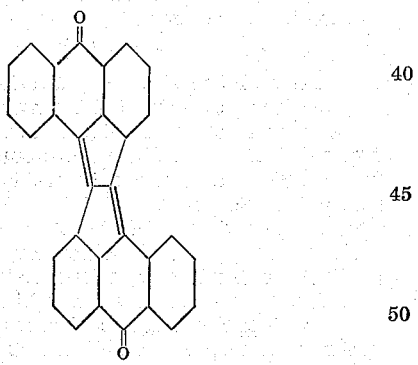

are condensed with 25 parts of 1-chloroanthraquinone by heating the mixture after the addition of about 800 parts of nitrobenzene, 15 parts of sodium carbonate and 2 parts of copper acetate, for about 10 hours while stirring at 200° C. The precipitate formed is filtered off, washed with chlorobenzene, with alcohol and finally with dilute sulfuric acid. When dry the formed condensation product of the formula:

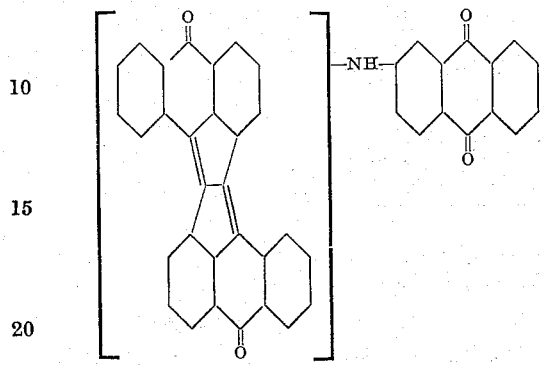

is obtained in dark brown crystals soluble in concentrated sulfuric acid with a violet color and dyeing cotton from a violet-brown vat reddish brown shades.

When the product is treated with anhydrous ferric chloride in the presence of nitrobenzene at 80 to 90° C. it is converted into a new vat dyestuff dyeing cotton from a brownish red vat yellowish brown shades.

Example 2

A mixture of 20 parts of the starting material of Example 1, 15 parts of 2-chloroanthraquinone, 8 parts of potash, 2 parts of copper acetate and about 400 parts of naphthalene is heated for about 16 hours while stirring at 200–210° C. The fusion mass is diluted with chlorobenzene, the precipitate formed is filtered off, washed and dried. The dyestuff formed of the formula:

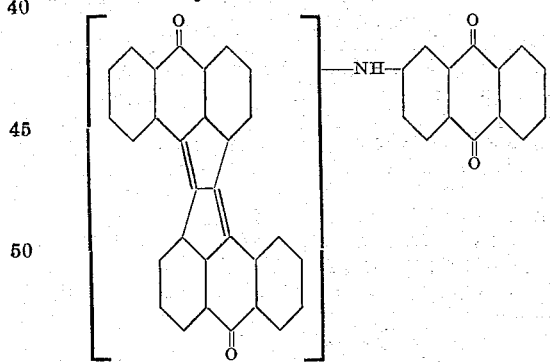

is obtained as a dark brown powder, soluble in concentrated sulfuric acid with a reddish blue color and dyeing cotton from a violet-brown vat reddish brown shades of good fastness properties.

Example 3

14 parts of the starting material used in Example 1 and 20 parts of dibromviolanthrone are mixed with 15 parts of anhydrous sodium acetate, 2 parts of copper acetate and about 400 parts of nitrobenzene, and the mixture is heated while stirring for 20 hours to 200° C. After filtration, washing and drying of the precipitate obtained, the dyestuff forms a black powder, soluble in concentrated sulfuric acid with a reddish blue color and dyes cotton from a navy blue vat blackish brown shades showing good fastness properties.

When subjected at about 140° C. to an aluminiumchloride fusion, in presence of common salt, the product yields a new dyestuff dyeing cotton from a blue vat olive-grey shades.

Example 4

20 parts of a diamino compound, obtained by nitration and reduction of the brown dyestuff of the formula shown in Example 1, are mixed with 3,6 parts of 1-chloro-4-benzoylamino-anthraquinone, 10 parts of potash, 2 parts of fine black cupric oxide and about 300 parts of naphthalene and the mixture is heated while stirring for about 12 hours to 200–210° C.; then it is diluted with chlorobenzene, the formed precipitate is filtered off, washed and dried.

The dyestuff thus obtained of the formula

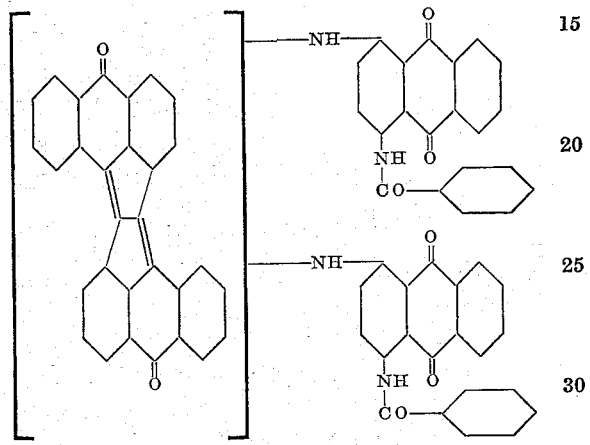

represents a crystalline black powder, soluble in concentrated sulfuric acid with a violet color and dyes cotton from a brownish violet vat reddish dark brown shades.

When aftertreated at about 50° C. with the twentyfold quantity of chlorosulfonic acid, the above product yields a dyestuff, soluble in concentrated sulfuric acid with a pure blue color and dyeing cotton from a brown vat in very fast yellowish-brown shades.

Example 5

A mixture of 15 parts of the starting material employed in Example 4, 30 parts of monobromoanthanthrone, about 600 parts of nitrobenzene, 30 parts of anhydrous sodium acetate, 1.5 parts of black fine cupric oxide and 1.5 parts of copper acetate is kept while stirring for 20 hours at the boiling temperature of the nitrobenzene; then the formed precipitate is filtered while hot, washed and dried.

The dyestuff thus obtained of the formula

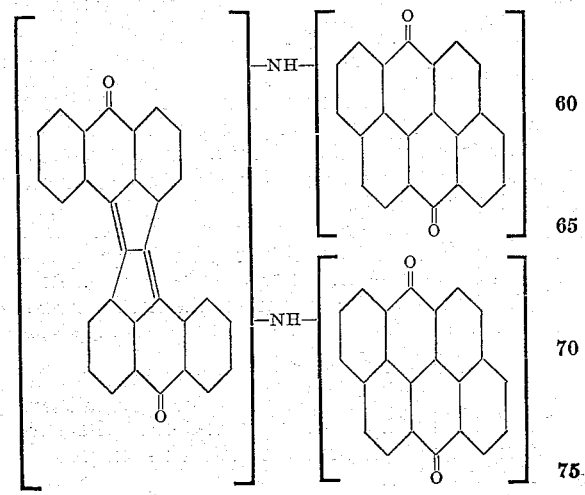

represents a black powder, soluble in concentrated sulfuric acid with a greenish blue color and dyes cotton from a violet-blue vat very fast blackish-brown shades.

Example 6

15 parts of the starting material used in Example 4 are mixed with 15 parts of monobromoanthanthrone, 15 parts of anhydrous sodium acetate, 1 part of copper acetate, 1 part of fine black cupric oxide and about 600 parts of nitrobenzene and the mixture is boiled under reflux. Then the precipitated dark product is filtered off and worked up.

The thus obtained black powder dyes cotton from a violet vat dark-brown shades. The dyestuff contains still a free amino group, capable of further reactions f. i. with benzoil chloride or 1-chloro-4-benzoylamino-anthraquinone, whereby new dyestuffs of blackish-brown shades are obtained.

Example 7

20 parts of a diamino compound, obtained by condensing 1-chloroanthrone with glyoxal, subjecting the condensation product successively to a fusion of alcoholic caustic potash and of aluminium chloride, by further condensing of the thus obtained condensation product with paratoluene-sulfamide and splitting off the toluene-sulfo-grouping by means of warm sulfuric acid, are mixed with 30 parts of bz₁-bromobenzanthrone, 15 parts of potash, 2 parts of fine black cupric oxide, 1 part of copper acetate and about 350 parts of nitrobenzene and the mixture is heated under reflux for about 12 hours; the condensation product is isolated.

The thus obtained product shows a currant color and dissolves in concentrated sulfuric acid with a reddish blue color; in the hydrosulfite vat it is only difficultly soluble. By fusion with alcoholic potash at about 120° C. the product is converted into a strong dark-brown vat dyestuff.

Example 8

14 parts of the starting material used in Example 1 and 18 parts of dibromoanthanthrone (cf. U. S. Patent 1,877,315) are mixed with about 400 parts of naphthalene, 3 parts of sodium carbonate, 5 parts of anhydrous sodium acetate, 0.2 part of black cupric oxide and 0.2 part of copper acetate, and the mixture is heated for about 8 hours at about 200° C. while stirring; then the mass is diluted with o-dichlorobenzene and the formed precipitate is filtered off and worked up.

The thus obtained dyestuff of the formula:

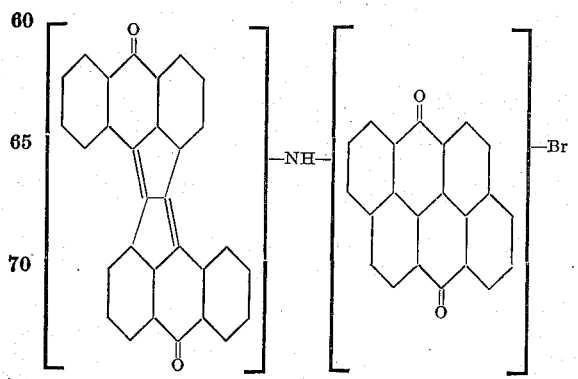

represents a brown powder, which is soluble in concentrated sulfuric acid with a blue color and dyes cotton from a violet vat fast reddish-brown shades. The product still contains a replaceable bromine atom capable of further reactions with amino anthraquinones, whereby fast deeply dark-brown dyestuffs are obtained; with 1-amino-anthraquinone f. i. one obtains a strong blackish-brown dyeing dyestuff.

We claim:

1. A process of making vat dyestuffs containing nitrogen which comprises condensing aminocompounds of the general formula:

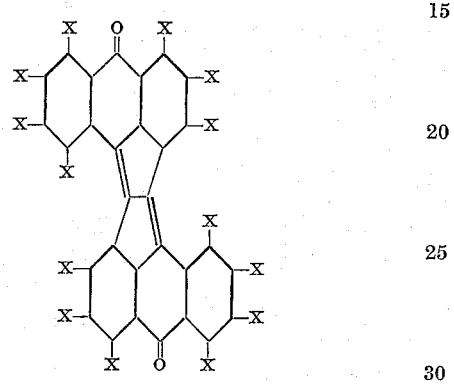

in which X is a member of the group consisting of hydrogen and amino, there being no more than two amino groups, with halogen compounds containing at least one replaceable halogen atom and a member of the group consisting of the anthraquinone, violanthrone and anthanthrone radicles.

2. Vat dyestuffs containing nitrogen of the general formula:

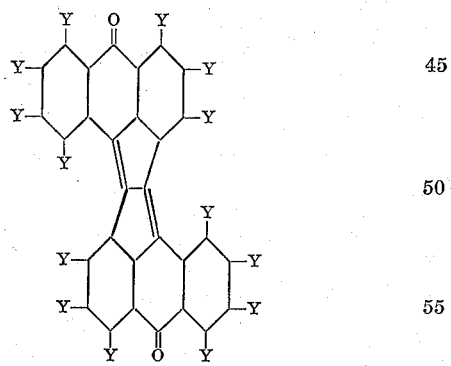

obtained by condensing aminocompounds containing no more than two aminogroups in the positions signified in the above formula by Y with halogen compounds containing at least one replaceable halogen atom and a member of the group consisting of the anthraquinone, violanthrone and anthanthrone radicles, corresponding to the above formula when one or two radicles signified by Y are radicles of the grouping —NH—A, wherein A means a member of the group consisting of the anthraquinone, violanthrone and anthanthrone radicles, the remainder being hydrogen, which dyestuffs dye cotton from the vat in most cases brown shades which turn more towards yellow when the dyestuffs are aftertreated with condensing agents.

3. A vat dyestuff containing nitrogen of the formula:

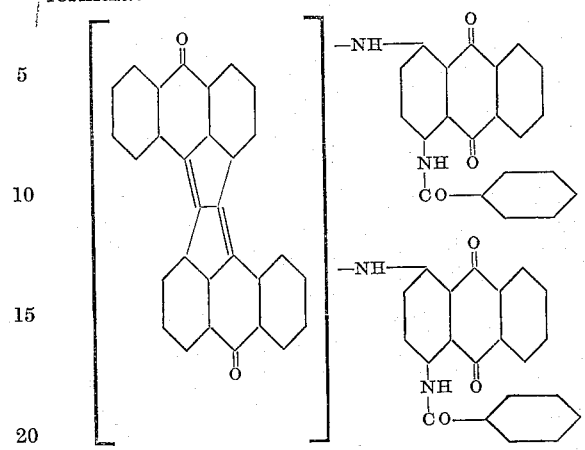

obtained by condensing a diamino compound of the formula:

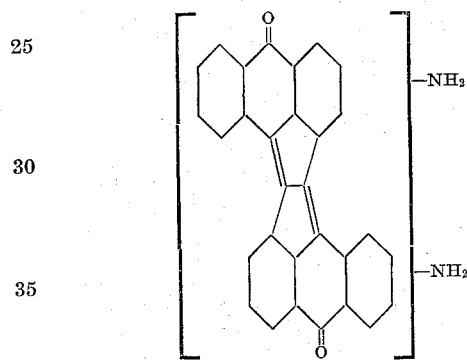

with 1 - chloro - 4 - benzoylaminoanthraquinone, which dyestuff is when dry a black crystalline powder, soluble in concentrated sulfuric acid with a violet color and dyes cotton from a brownish violet vat reddish dark brown shades, which dyestuff is converted by aftertreatment with chlorosulfonic acid into a further dyestuff, soluble in concentrated sulfuric acid with a pure blue color and dyeing cotton from a brown vat very fast yellowish brown shades.

4. A vat dyestuff containing nitrogen of the formula:

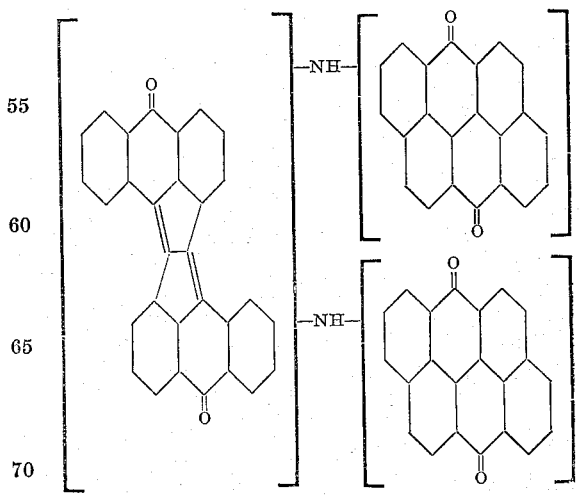

obtained by condensing a diamino compound of the formula:

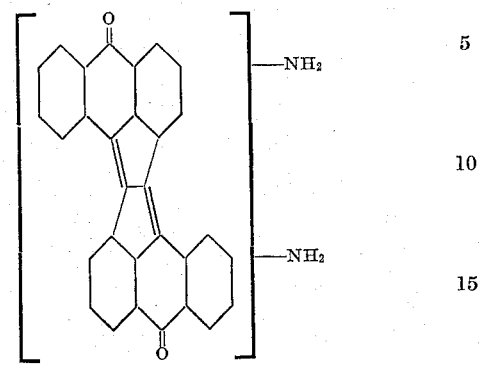

with monobromoanthanthrone, which dyestuff is when dry a black powder, soluble in concentrated sulfuric acid with a greenish blue color and dyes cotton from a violet-blue vat very fast blackish brown shades.

5. A vat dyestuff containing nitrogen of the formula:

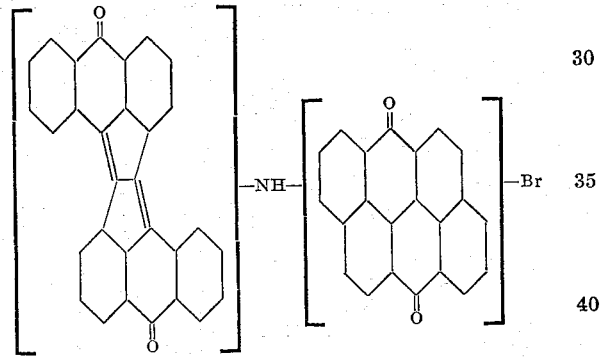

obtained by condensing a monoamino compound of the formula:

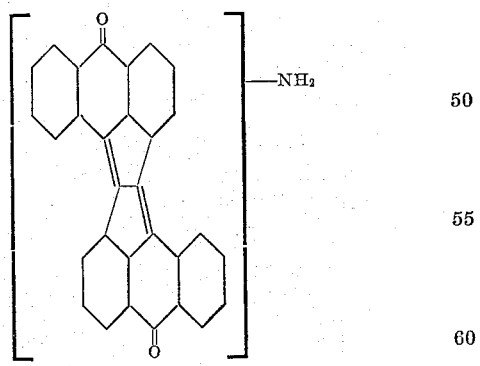

with dibromoanthanthrone, which dyestuff is when dry a brown powder, soluble in concentrated sulfuric acid with a blue color and dyes cotton from a violet vat fast reddish brown shades, which dyestuff is converted by further condensation with 1-amino-anthraquinone into a dark blackish brown.

HEINZ SCHEYER.
EMIL SCHWAMBERGER.